E. E. F. CREIGHTON.
ELECTRICAL APPARATUS.
APPLICATION FILED MAY 8, 1916.
1,317,002. Patented Sept. 23, 1919.
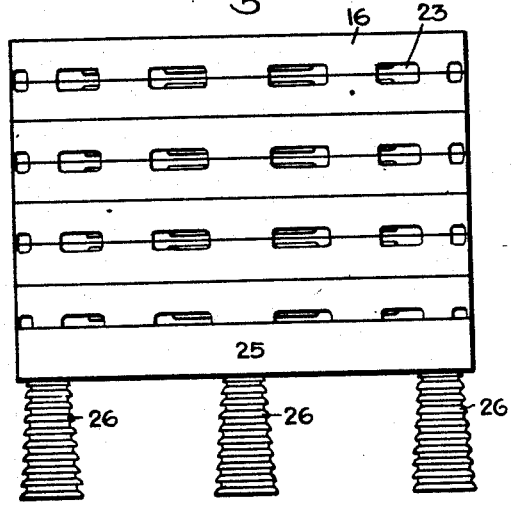
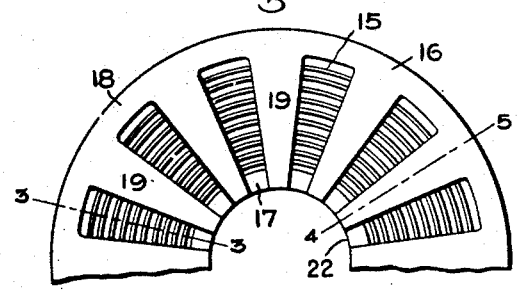
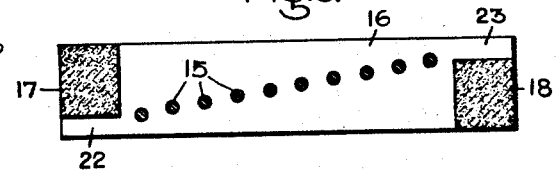
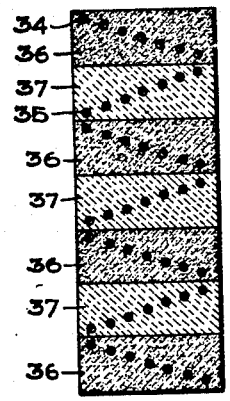
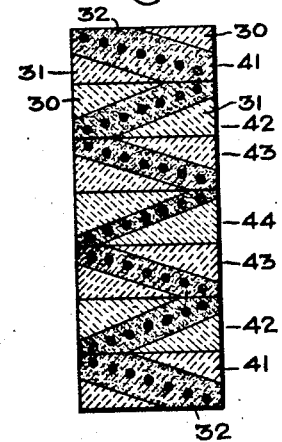
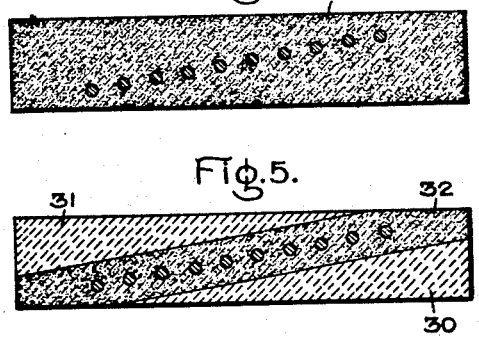
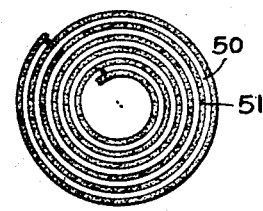
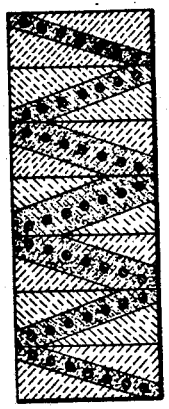
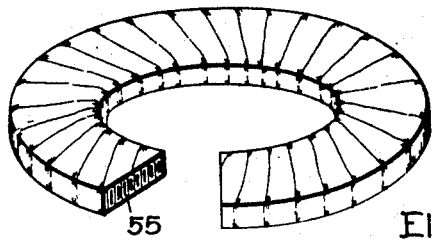
Inventor:
Elmer E. F. Creighton,
by
His Attorney.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

ELECTRICAL APPARATUS.

1,317,002.  Specification of Letters Patent.  Patented Sept. 23, 1919.

Application filed May 8, 1916. Serial No. 96,057.

*To all whom it may concern:*

Be it known that I, ELMER E. F. CREIGHTON, a citizen of the United States, residing at Schenectady, in the county of Schenectady, State of New York, have invented certain new and useful Improvements in Electrical Apparatus, of which the following is a specification.

In its broad aspect my invention is applicable to various types of electrical apparatus; it relates particularly, however, to reactors and is of peculiar interest to other electrical apparatus comprising windings. My invention has a number of objects. One object is to protect electrical apparatus against the effects of excessive voltages, particularly against the gradual building up or development of such voltages as by resonance and transient phenomena of steep wave fronts. Still another object is the absorption or dissipation of abnormally high frequency energy and the energy of transients of steep wave fronts. My invention may be embodied in various types of working apparatus for the accomplishment of these objects in such apparatus directly, or it may be embodied in apparatus which is esssentially protective in its nature and employed for the protection of other apparatus. In this latter aspect my invention contemplates the provision of a high frequency absorber and also an improved reactor of simple and cheap construction embodying in it the characteristics of a high frequency absorber.

A reactor for power or current limitation embodying my invention is illustrative of the general nature and application of my invention. In carrying out the objects of my invention, I cause the reactor to consume, absorb, or dissipate energy of excessive voltages, and to this end I preferably provide for the distributed leakage of current between turns of the reactor, as by distributing electrical energy consuming paths between the turns. The resistance of these consuming paths is so high that, at least under normal differences of potential between turns, little leakage occurs under normal conditions, and hence little energy is lost during normal operation. Under excessive differences of potential between turns, however, such as those caused by resonance, or by surges or traveling waves of steep wave fronts when encountering the inductance of the device, or under excessive potentials produced in any other way, the leakage between turns is increased to such values as to dissipate appreciable energy of the excessive voltages, and hence of the abnormal frequencies or other factors which may have caused those voltages. By more or less thoroughly distributing the energy consuming or leakage paths throughout the winding rather than disposing them at a very few points, protection is secured not only against excess potentials appearing at the terminals of the apparatus but also against local or internal excess potentials as those resulting from internal resonance and surges and such as may not appear at the connection points of concentrated resistance. The application of leakage paths to various apparatus may take a number of forms, depending upon the considerations encountered; some of these forms are later described in some detail. From another aspect my invention, both as applied to reactors and to other electrical apparatus, comprises the use of semi-conducting material between turns in more or less distributed masses, the semi-conducting material acting substantially as an insulator under normal conditions and potentials but passing sufficient current under excessive potentials, such as potentials built up by dangerously excessive frequencies, to relieve the dangerous stresses or prevent the appearance of the stresses in dangerous values. The nature of the semi-conducting material is more particularly described hereinafter.

A reactor as thus provided with leakage paths in addition to its functions as a current limiter strictly at normal frequencies, possesses the functions of and is in effect a high frequency absorber. My invention provides further, however, for a high frequency absorber which need not necessarily possess the ability to limit the current materially at normal frequencies as does a reactor. A high frequency absorber according to my invention need possess merely sufficient inductance to build up the voltages of the abnormal frequencies, traveling waves, or other transients, to some excessive value; the inductance being shunted by leakage paths for absorbing appreciable energy at such value of voltage, the leakage paths being preferably distributed and preferably provided by semi-conducting material between adjacent turns or other sections of the device. Such absorbers may, for example, be distributed along a transmission line, since their impedance values at normal frequencies may be so low that they have substantially no effect on the normal energy flow.

While my invention is, then, particularly applicable to reactors and high frequency absorbers, it is also applicable to other apparatus for the direct protection thereof, peculiarly to such apparatus, as comprise windings, leakage paths being provided as in reactors between conducting portions of the parts of the apparatus to be protected. In some other electrical windings there is more likelihood of developing dangerously excessive potentials by resonance and transients generally, especially internally or locally, than in windings of reactors. In such apparatus it is particularly desirable to more or less thoroughly distribute the leakage paths throughout the same for protection especially against the abnormal internal or local voltages of resonance. Providing working apparatus with such means for securing its own protection tends to the elimination of apparatus which is entirely protective in its functions.

The semi-conducting material preferably is of such high resistance under normal conditions as to be substantially an insulator; on the other hand, under excessive potentials which are too low to be dangerous to the apparatus, it must pass sufficient current to dissipate, absorb, or consume appreciable energy. Suitable materials may be found in mixtures of insulating materials and conducting materials. A mixture of an insulating material and a very high resistance conducting material seems preferable, although a mixture of an insulating material and a low resistance conducting material is suitable in some cases. The mixture should generally be very intimate to secure the best results as uniformity and stability, and to this end the constituent materials in some cases, if in solid states, should be finely divided. The proportions of the two kinds of material will vary with the conditions, as the thickness of the masses between the conducting parts of the apparatus to which it is applied, the potentials to which such masses are to be subjected, and the characteristics of the materials themselves. Preferably, the semi-conducting material will possess a negative ampere-volt characteristic; that is, its resistance will decrease as the voltage or power applied to it increases (preferably independently of the temperature). Carborundum gives this effect. I have found a mixture of Portland cement and finely divided petroleum coke in substantially the proportions of from one to two parts of coke to one part of cement, measurement by volume, to very well suit the conditions usually met in the construction of reactors and other high frequency absorbers. The mixture may be impregnated with a suitable water-proofing material to prevent the absorption of moisture.

Since as before indicated, my invention is particularly applicable to power or current limiting reactors, and such reactors embodying my invention are illustrative of the general nature and application thereof, I shall for the most part illustrate and describe in detail only the application of my invention to reactors. Its application to other electrical apparatus will be understood therefrom. Referring now to the accompanying drawing: Figure 1 is an elevation of a reactor embodying my invention. Fig. 2 is a plan view of one of the sections thereof. Fig. 3 is a sectional view of the section of Fig. 2 on the line 3—3. Figs. 4 and 5 are sectional views on the line 4—5 of a section like that of Fig. 2 illustrating different constructions of the same. Figs. 6, 7, and 8 are cross-sections substantially on the line 4—5 of Fig. 2 of one-half of a reactor like that of Fig. 1 illustrating different constructions thereof. Figs. 9 and 10 illustrate other applications of my invention.

In the reactor illustrated the conductors 15 are substantially bare, that is, without insulation. The reactor comprises a plurality of horizontal sections like that of Fig. 2, each section containing one layer or coil of the conductor. The conductor of each coil or layer is wound up on a removable form during the construction of the device, the layer or coil being disposed at an angle to the winding axis as appears from Fig. 3. While the conductor or conductors are thus held in place, a plastic 16, some of it at least semi-conducting, is cast about the conducting parts. Each section comprises an inner ring 17 and outer ring 18 joined by a plurality of radial supports or arms 19. As appears from the figure the conductor is carried directly in these supports 19. A space 22 is left (see Figs. 2 and 3) between the inner ring 17 and the bottom of the section and a corresponding space 23 is left between the ring 18 and the top of the section. So many of the sections as may be necessary in a particular case are assembled together as illustrated in Fig. 1 to compose the complete reactor, the coils being interconnected at the inside and outside of the reactor alternately. Preferably the sections are alternately reversed (see Fig. 6) so that the inner layers are alternately disposed at opposite angles to the winding case; in this way turns between which greater differences of potential exist are spaced farther apart than turns between which the difference of potential is of less value. The sections are assembled with the arms 19 of each section immediately above the arms 19 of the section below as appears from Fig. 1. The spaces 22 and 23 and the spaces between the arms where the conductors are exposed, provide adequate ventilation. An annular ring 25 of any suitable material supported by insulators 26 provides a support for the reactor without materially impeding the circulation of the cooling fluid (generally the air of the atmosphere) through the vertical spaces provided between the separated arms 19. The annular ring 25 and insulators 26, insulate or complete the insulation of the reactors and the semi-conductor thereof (later referred to) from ground, except, of course, as the conductor or conductors 15 of the reactor may be connected to ground in some instances.

As before indicated, the plastic, or at least so much of it as is disposed between some of the turns of the device, is of a semi-conducting nature. Also as before indicated, this semi-conducting plastic may be composed of from one to two parts of very finely divided petroleum coke to one part of Portland cement, the measurement being by volume, sufficient water being added to make the mass sufficiently fluid to be readily applied. The entire plastic mass may be composed of this semi-conducting material as is indicated in Fig. 4. However, for purposes of economy or otherwise, a part of the total mass may be composed of some other material, preferably a plastic, which may even be non-conducting as illustrated in Fig. 5. Here the wedge-shaped sections 30 and 31 are composed of insulating material, only the part 32 disposed adjacent the turns being semi-conducting. This construction may be used when the voltage between opposite end turns of two adjacent coils, as the turns 34 and 35 of Fig. 6, is likely to be higher than should be impressed upon the semi-conducting material of the sort used and of the thickness of the distance between these turns, the material of the parts 30 and 31 being of sufficiently high dielectric strength to withstand the voltage between such turns as 34 and 35 and between the turns respectively adjacent thereto. Using such a construction a reactor may have smaller dimensions in some cases than were the whole reactor of the semi-conducting material. Under the same conditions or for the same purposes the modification illustrated in Fig. 6 may be employed. Here only the alternate sections 36 are composed of semi-conducting material, the remaining sections 37 alternating therewith being composed of an insulating material of the requisite dielectric strength. I have found that where only alternate coils are composed of semi-conducting material the device is quite generally sufficiently protective.

The provision of leakage paths for excessive potential differences between turns tends to distribute such potentials throughout the winding when they would otherwise tend to concentrate on one or a few turns; the leakage paths in effect tend to limit the potential differences between turns or other conducting parts of the apparatus to which they are applied.

It is especially advantageous therefore to provide suitable leakage paths between the end turns of electrical windings or between the turns of the terminal coils. A reactor provided with leakage paths does not reflect back a disturbance coming to it to the extent of reactors with thoroughly insulated turns nor does it pass on out at the opposite terminal as much of the energy of a disturbance which succeeds in entering the reactor as a thoroughly insulated reactor, but a reactor with leakage paths takes a material part of the energy of the disturbance into itself, dissipates a considerable part of the energy entering it and passes on but a little part of this entering energy. These actions may be modified, either induced or repressed, by giving the leakage paths proper values of resistance, as by grading the resistance of the leakage paths. Grading of the resistance may be carried out in a number of ways. When the semi-conducting material is a mixture such as before mentioned, the differences in the resistances of the leakage paths in different parts of the device will probably generally be brought about by differences in the proportions of the materials composing the mixtures. Since, however, differences in the constitution of the semi-conducting material are difficult to illustrate, I have chosen to illustrate grading by differences in the thicknesses of the layers of semi-conducting material in the different sections, each of these sections as a whole resembling the section illustrated in Fig. 5, that is, composed of masses of insulating material between which a layer of semi-conducting material is disposed. In Fig. 7 the semi-conducting material 32 of the sections 41 at the opposite ends of the reactor is of considerable depth and hence of low resistance between turns; of the sections 42 adjacent thereto, of a less depth and somewhat higher resistance between turns; of the sections 43 adjacent to the sections 42 of a still smaller depth and still higher resistance, and of the section 44 at the middle of the reactor of the least depth and highest resistance between turns. In short, the resistances of the leakage paths between adjacent turns are of the lowest values adjacent the ends of the reactor and gradually increase in value from both ends toward the center of the reactor, reaching their greatest values at the center thereof. A reactor with such graded leakage paths readily takes into itself a considerable portion of a disturbance reaching it from either end, and hence receives and dissipates or absorbs a considerable part of the energy of the disturbance, and reflects back toward the source of the disturbance a smaller part of the energy of the disturbance than a thoroughly insulated reactor. In Fig. 8 is illustrated a reactor in which the resistances of the leakage paths are so graded that a greater part of the disturbance (coming from either side) is reflected back toward its source than is the case with the reactor of Fig. 7, but the energy of the disturbance which succeeds in entering the reactor is more and more readily dissipated as it proceeds toward the center of the reactor and hence less is passed on through the reactor to the circuit at the side opposite that on which the disturbance originated. In the reactor of Fig. 8 the leakage paths adjacent the two terminals are of the highest resistances, and the resistance gradually decreases in value from both ends toward the center. In grading the resistance between turns of a reactor the direction of grading will depend upon the use of the reactor. If, for example, the reactor is to be used between a highly insulated line and a transformer it will at times be desirable to reflect as much as possible of the traveling wave back onto the line again and have all that enters the reactor as fully absorbed as possible. Any surge which enters the reactor will have its wave front gradually flattened as it progresses through the coil. Therefore in this case there should be a high resistance between the turns at the line terminal of the reactor and the resistance should decrease in value from this terminal toward the other end of the coil. If, on the contrary, the reactor is for use between transformers where it is undesirable to reflect surges which emanate in the transformers back into the transformers, the grading of the resistance should be as illustrated in Fig. 7, that is to say, the lower resistances should be at the end turns and the higher resistances near the center turns.

My invention may be applied to other electrical windings than reactors as hereinbefore indicated. It may also be applied in other fashions than those hereinbefore described. In Fig. 9 I have illustrated a coiled conductor 50 between turns of which is disposed the semi-conducting material 51; in this case the semi-conducting material 51 does not extend entirely about the conductor (as in the preceding figures) but is as thoroughly distributed as possible through the coil. In Fig. 10 I have illustrated a so-called disk coil, the conductors 55 of which are substantially rectangular in cross-section and separated by a semi-conducting material. The whole coil is taped in a well known manner.

I have above explained the principle of my invention, and in explaining the best mode in which I have contemplated applying that principle so far as it relates to reactors, I have shown and described a reactor comprising a mass of plastic for supporting and holding the turns of the reactor in position. This matter is not claimed in the present application but is shown and described and also claimed in my co-pending application Serial No. 100,553 filed on or about May 29, 1916. Obviously my present invention is not limited to such a construction and altogether my invention is subject to many modifications. Other modifications will occur to those skilled in this art and I aim in the appended claims to cover all modifications which do not involve a departure from the spirit and scope of my invention.

What I claim as new and desire to secure by Letters Patent of the United States, is:

1. Electrical apparatus for absorbing high frequency energy comprising a conductor and semi-conducting material distributed in electrical contact with said conductor and of a character to pass appreciable current between points on said conductor only when subjected to abnormal differences of potential.

2. Electrical apparatus for absorbing high frequency energy comprising a conductor and a semi-conducting material distributed in electrical contact with said conductor, arranged to support said conductor and of a character to insulate the same when subjected to normal differences of potential but passing current between points on said conductor when subjected to abnormal differences of potential.

3. Electrical apparatus for absorbing high frequency energy comprising a coiled conductor and a semi-conductor between turns thereof, said semi-conductor being of a character substantially to insulate said turns from each other under normal differences of potential between said turns and to pass appreciable current between said turns under excessive differences of potential between said turns.

4. Electrical apparatus for absorbing high frequency energy comprising a coiled conductor and semi-conducting material in distributed electrical connection with the same, said semi-conducting material being of a character substantially to insulate the turns of said conductor from each other under normal differences of potential between said turns and to pass appreciable current between said turns under excessive differences of potential between said turns.

5. Electrical apparatus for absorbing high frequency energy comprising a coiled conductor and semi-conducting material in a portion thereof, said semi-conducting material being of a character substantially to insulate the turns of said portions from each other under normal differences of potential between said turns and to pass appreciable current between said turns under excessive differences of potential between the turns in said portion.

6. Electrical apparatus for absorbing high frequency energy comprising a coiled conductor and semi-conducting material between end turns thereof, said semi-conducting material being of a character to insulate said end turns from each other under normal differences of potential between said end turns and to pass appreciable current between said end turns under excessive differences of potential between said end turns.

7. A high frequency absorber possessing inductance and means distributed through said absorber comprising resistance paths of a character adapted to pass appreciable current between portions of the inductance only under excessive differences of potential between the terminals of the absorber.

8. A reactor adapted to absorb high frequency energy comprising, a coiled conductor having its turns inductively related to one another and a support therefor, said support having semi-conducting material embedding the turns which material is of a character to pass appreciable current between turns only when said conductor is subjected to abnormal differences of potential.

9. Electrical apparatus comprising conducting portions and means for absorbing high frequency energy, said means comprising semi-conducting material of such character as to become conducting at abnormally high differences of potential and disposed between those portions which are at different potentials when the terminals of said apparatus are maintained at different potentials, and means for insulating said absorbing means from ground.

10. In a high frequency absorber, the combination with an electrical winding, of semi-conducting material distributed between and in conductive relation with successive turns thereof, said semi-conducting material being insulated from ground and of a character to become conducting only when subject to abnormal differences of potential.

11. In a reactor for absorbing high frequency energy, the combination with a coiled conductor, of means distributed between turns thereof and of a character to provide for the leakage of current between said turns only when subject to abnormal differences of potential, and means for insulating the first mentioned means from ground.

12. A coiled conductor, and means having resistance paths distributed between turns thereof of such character as to dissipate electrical energy only when subjected to excessive potentials, said coiled conductor and means forming a reactor, and means for insulating said reactor from ground.

13. Electrical apparatus comprising conducting portions and means for absorbing high frequency energy, said means providing leakage paths distributed between such portions and said leakage paths having a negative ampere-volt characteristic and conducting current when the terminals of said apparatus are maintained at different potentials.

14. An electrical winding and means providing leakage paths having a negative ampere-volt characteristic distributed between turns thereof.

15. Electrical apparatus comprising a coiled conductor and a semi-conductor having a negative ampere-volt characteristic between turns thereof.

16. Electrical apparatus comprising a coiled conductor and semi-conducting material disposed between turns thereof, the resistance of said semi-conducting material being graded between turns from the terminals of the coiled conductor toward the center thereof.

17. An electrical winding comprising a plurality of turns, some of which are insulated, semi-conducting material being provided between other turns.

18. An electrical winding comprising a plurality of coils, the turns of alternate coils being separated from each other by insulating materials and semi-conducting material.

19. A coiled conductor and means distributed between turns thereof for dissipating electrical energy, the whole forming a high frequency absorber, said means being graded in energy dissipating power from one terminal of said absorber toward the other.

20. A coiled conductor and semi-conducting material disposed between turns thereof forming a reactor, the resistance of said semi-conducting material being graded between turns from one end of said coiled conductor toward the other.

21. A coiled conductor and semi-conducting material distributed throughout the same and disposed between turns thereof forming a reactor, the resistance of said semi-conducting material being similarly graded between turns from both ends of the coiled conductor toward the center.

22. A mixture of cement and finely divided coke in substantially the proportions of from one to two parts of coke to one part of cement, measurements by volume, forming a semi-conductor.

In witness whereof I have hereunto set my hand this 6th day of May, 1916.

ELMER E. F. CREIGHTON.